ated Sept. 11, 1973

United States Patent Office 3,758,453
Patented Sept. 11, 1973

3,758,453
STABLE FREE-RADICAL STRUCTURES PREPARED FROM SERUM ALBUMIN AND NITROSYL DISULFONATE
Byrel D. Polis, Wyndmoor, Pa., assignor to the United States of America as represented by the Secretary of the Navy
No Drawing. Continuation-in-part of abandoned application Ser. No. 74,487, Sept. 22, 1970. This application Feb. 22, 1972, Ser. No. 228,286
Int. Cl. C07g 7/00
U.S. Cl. 260—121　　　　　　　　　　　　　　1 Claim

ABSTRACT OF THE DISCLOSURE

Subject disclosure relates to a stable free-radical product, its use to produce brain excitation in mammals when intravenously administered, and a method of preparing the free-radical product. The free-radical product is prepared from purified plasma proteins, pituitary peptides and other structures containing tyrosine or tryptophan by oxidation with a free-radical nitrosyl disulfonate product in alkaline solution under controlled conditions. Intravenous administration of the free-radical product into mammals causes a sudden electroencephalographic arousal accompanied by behavioral changes indicative of brain excitation. Illumination of the free-radical product by visible light prior to administration substantially enhances the arousal and brain excitation effects.

---

This is a continuation-in-part application of my copending application Ser. No. 74,487, filed Sept. 22, 1970, now abandoned.

The invention described herein may be manufactured and used by or for the Government of the United States of America for governmental purposes without the payment of any royalties thereon or therefor.

In the various chemical reactions of living systems, free energy is often exchanged by the transformation of electronic energy present in chemical bonds. In the photobiological and radiobiological arts, the electron excited state or the free-radical form of substances plays an important role in transformation reactions. Similarly, it is believed that the free-radical or electron excited state of the substance plays an important role in transformation reactions of mammalian biological systems. Although various substances have been developed in the past to produce brain arousal and brain excitatory effects in mammals, few relatively stable free-radical substances are known which can be injected into the animal system for that purpose.

It is therefore a principal object of the invention provide a novel and improved substance which is relatively stable in its free-radical state and which is particularly useful in inducing arousal and brain excitatory effects in mammals.

It is a further object of the invention to convert molecules of a naturally occurring substance to a stable free-radical state such that upon injection into a mammalian system they modify the brain function in an energy transfer reaction.

Further objects and advantages of the invention will be apparent hereinafter.

In accordance with the invention, unique relatively stable free-radical substances are injected into intact mammals to produce a neurophysiologically excited state which is apparently caused by the transfer of the energy of electron excited molecules to structures that induce brain excitatory effects. The stable free-radical substances are prepared from crystalline albumin, purified fractions of serum proteins, hormonal peptides and other structures which contain tyrosine or tryptophan by reacting the same with nitrosyl disulfonate in a slightly alkaline solution at a reduced temperature such as 5° C. using 2 to 4 moles of nitrosyl disulfonate per mole of the tyrosine or tryptophan containing substance. The presence of either the tyrosine or tryptophan amino acid in the compound was found to be a prerequisite for the stable free-radical formation. The free-radical was found to be stable for weeks in solution at 5° C. and has been maintained in its free radical state for nearly a year at −20° C. Illumination of the free-radical compounds by visible light for 1–5 minutes immediately prior to their administration to the mammal substantially enhanced their effect. Various stable free-radical substances containing tyrosine or tryptophan were prepared under substantially similar conditions with varying final steps for separation of the free-radical from other reaction products and excess reactants to suit the properties of the protein or peptide. More specifically, stable free radical molecules were obtained from such substances as $\alpha$ and $\beta$ globulins, bovine growth hormone, thyrotrophin, glucagon, follicle stimulating hormone, luteinizing hormone, adrenotrophin, insulin, thyroxin, melatonin and 5-OH tryptophan.

Specific and preferred embodiments of the improved free-radical substance of the invention are illustrated by the following examples:

EXAMPLE 1

Three grams of 3X recrystallized bovine serum albumin were dissolved in 100 ml. of saline-phosphate buffer (.15 M NaCl, .01 M PO$_4$, pH 8.1). Solutions of nitrosyl disulfonate (NDS) were prepared from Fremy salt having the formula [ON(SO$_3$)$_2$K$_2$]$_2$ by dissolving .8 gram of the salt in 45 ml. of .1 M N$_2$HPO$_4$ and diluting to 100 ml. with water. The final pH was 7.5. This formed a fairly stable solution of NDS free-radical. Concentrations were determined from optical density measurements at 545 millimicrons using 20.8 as the molar extinction coefficient. The albumin solution was mixed with an equal volume of the .025 M NDS solution. After standing overnight at 5° C., the purple color of the NDS disappeared and the protein became colored a deep burgundy red. The protein was separated from reaction products and excess NDS by precipitation with 3.6 M ammonium sulfate and subsequent dialysis to remove the salt and by chromatography. The protein free-radical was stable for weeks in solution at 5° C. Samples were maintained in their free-radical state for nearly a year when frozen at −20° C.

EXAMPLE 2

2 grams of rabbit alpha globulin Cohn Fraction IV–1 were dissolved in 90 ml. of saline-Na$_2$HPO$_4$ buffer. 52.53 ml. of .03173 M NDS were then mixed with the globulin solution and the mixture was diluted to a total volume of 166 ml. The resulting free-radical product, which contained 1.204% protein, was separated from excess reactants and other reaction products by methods similar to those described in Example 1.

EXAMPLE 3

2 grams of rabbit beta globulin FR 111 were dissolved in 90 ml. of saline-Na$_2$HPO$_4$ buffer. 52.53 ml. of .03173 M NDS were then mixed with the globulin solution and the mixture was diluted to a total volume of 153 ml. The resulting free-radical product, which contained 1.307% protein, was separated from excess reactants and other reaction products by methods similar to those described in Example 1.

EXAMPLE 4

150 mg. of bovine growth hormone having a pH of 8.2 and 1% protein was diluted to 30 ml. with .1 M Na$_2$HPO$_4$. 20 ml. of .025 M NDS were then mixed with the hormone solution to form the desired free-radical product. The free-radical product was separated from excess reactants and other reaction products by centrifuge and dialysis methods similar to those described in Example 1.

EXAMPLE 5

50 mg. of glucagon was dissolved with a little NaOH in a $PO_4$ buffer. The pH of the solution was approximately 10 but was immediately taken down to 8 with HCl. 2 ml. of .025 M NDS were thin mixed with the glucagon solution to form the desired free-radical product. The free-radical product was separated out and concentrated by passing the same through a UM3 Diaflow Ultrafilter.

EXAMPLE 6

202.1 mg. of adrenotrophin was placed in solution to a total volume of 7.4 ml. The solution had a pH of 6.7. 11 ml. of .025 M NDS were then mixed with the adrenotrophin solution in a cold room for 24 hours to form the desired free-radical product. The free-radical product was separated from excess reactants and other reaction products by methods similar to those described in Example 1.

EXAMPLE 7

100 mg. of old crystalline zinc insulin was dissolved in 2 ml. of .025 M NDS to form the desired free-radical product. The free-radical product was separated from excess reactants and other reaction products and concentrated on an ultrafilter.

EXAMPLE 8

10 ml. of thyroxine (.001 M in .005 M NaOH) was combined with 1 ml. of .025 M NDS and left at room temperature for 2 hours. The solution was then taken to a pH of 3 with .5 M $H_2SO_4$. The resulting free-radical product was precipitated in alcohol and separated from excess reactants and other reaction products by methods similar to those described in Example 1.

EXAMPLE 9

One volume of .047 M 5 hydroxytryptophan was mixed with two volumes of .025 M NDS to form the desired free-radical product. The free-radical product was separated from excess reactants and other reaction products by methods similar to those described in Example 1. Inasmuch as this free-radical product was relatively unstable, the same was used in its various mammalian experiments described hereinafter immediately after its preparation.

Various tests and experiments were performed using the free-radical substances obtained in the above described examples. Visible and ultraviolet absorption spectra of the free-radical substances were obtained with a Cary spectrophotometer. The spectra differences between the free-radical substances and their normal tyrosine or tryptophan containing derivatives were characterized by the appearance of a broad absorption band with a shoulder at 490 millimicrons in the visible region of the spectrum and a shift of the 278 millimicron band in the ultraviolet region to a double peak at 275 and 280 millimicrons with marked increases in absorbance.

Free-radical measurements were made with a Varian electron spin resonance spectrometer with the amplified signal being passed through a 60 cycle notch filter to a computer that averaged transients. ESR measurements of the free-radical substances yielded spectrum results which demonstrated a threefold increase in free-radical concentration when the free-radical substances were preliminarily illuminated with visible light from 1–5 minutes. Various fractions of serum proteins and hormonal peptides yielded free-radical substances with varying spectral intensities depending on the tyrosine and tryptophan content of the molecule. Larger molecules like $\gamma$ globulins, myosin and some preparations of growth hormones tended to crosslink and form colored insoluble polymers. Smaller molecules like 5-OH tryptophan rapidly turned from a red to a deep brown solution which then stabilized in a soluble free-radical state. When stored in solution at 5° C., this 5-HTP free-radical slowly formed an insoluble melanin-like polymer.

Experiments were also performed on 3.5 to 4.0 kgs. adult male albino rabbits with chronically implanted cranial electrodes. The electrical activity was bipolarly recorded from the anterior part of the parietal cortex. The unfiltered amplitudes of an electroencephalograph were measured continuously with an electronic integrator. The values used in the computations were the cumulative scores of amplitudes obtained on successive periods of one minute each throughout the experimental runs. These runs started with a ten minute period during which the animals were kept aroused by varied sensory stimulations. Thereafter, a small dose of Na pentobarbital (3 mg./kg. i.v.) was administered in order to induce a mild, unspecific, sustained state of sedation. All stimuli were stopped. Five minutes after inception of sedation, the test compound was injected and the animals were left undisturbed for 30 minutes.

All drug administrations were performed from a distance via a catheter inserted in the marginal ear vein. The animals were carefully trained to the experimental procedures which took place in a sound attenuated enclosure. Except for the venous catheter and the wire connecting the electrodes to the recording device, the rabbits were not restrained. Drug and control sessions were spaced one week apart.

Variations in the EEG amplitudes were measured in three experiments performed on the same animal with normal protein or peptide, with the free-radical protein or peptide and with the free-radical protein or peptide illuminated with visible light prior to administration for five minutes. The state of sedation followed pentobarbital administration was manifested in the EEG by the presence of spindles of high voltage, low frequency waves which persisted for an average of 20 minutes after the injection of physiological saline or normal crystalline serum protein or peptide. Following administration of the free-radical compounds, a shift from high amplitude, low frequency waves to low amplitude high frequency waves occurred demonstrating arousal properties. Complete arousal brought back the wave amplitudes and frequencies to the levels prevailing prior to sedation with pentobarbital. During the high EEG amplitude recordings, the animals were sitting or lying quietly while during the low amplitude recordings, the animals were moving about, searching, licking, etc. When the free-radical substances were illuminated by light prior to administration, the intensification of free-radical concentration observed by the ESR measurements was accompanied by increased arousal and excitatory activities in the animals.

It has therefore been found that the conversion of naturally occurring molecules containing tyrosine or tryptophan to a free-radical state specifically provides arousal and brain excitatory effects in mammals and apparently generally offers a new approach to the molecular modification of brain function and a better understanding of the biochemistry of energy transfer mechanisms in living systems.

Obviously, many modifications and variations of the present invention are possible in the light of the above teachings. It is therefore to be understood that within the scope of the appended claim, the invention may be practiced otherwise than as specifically described.

What is claimed is:

1. A method of preparing a stable free-radical product which comprises the steps of:
    dissolving three grams of 3X recrystallized bovine serum albumin in 100 ml. of saline-phosphate buffer (.15 M NaCl, .01 M $PO_4$, pH 8.1) to form an albumin solution;

dissolving .8 gram of fremy salt in 45 ml. of .1 molar Na$_2$HPO$_4$;
diluting said fremy salt and .1 molar Na$_2$HPO$_4$ with 100 ml. of water to form nitrosyl disulfonate;
mixing said albumin solution with an equal volume of said nitrosyl disulfonate to form a first product;
standing said first product at 5° C. until said product becomes a color of deep burgundy red;
precipitating said first product with 3.6 M ammonium sulfate to separate the protein from the reaction products;
removing the salt from said protein by means of dialysis and chromatography to form said stable free-radical product;
freezing said stable free-radical product at −20° C.

References Cited

Chem. Abstracts, vol. 53, 1959, 10789d–e, Teuber.
Chem. Abstracts, vol. 66, 1967, 19644x, Earland et al.
Jour. of the Textile Institute, May 1960, pp. 817–827, Earland et al.
Chem. Abstracts, vol. 72, 1970 (effective date October 1969), 64510k, Polis et al.
Polymer. 7(11), pp. 549–556, 1966, Earland et al.

HOWARD E. SCHAIN, Primary Examiner

U.S. Cl. X.R.

260—112 B, 112 R, 112 T, 112.7, 999